(12) United States Patent
Knuth et al.

(10) Patent No.: US 6,865,878 B2
(45) Date of Patent: *Mar. 15, 2005

(54) HYBRID ROCKET ENGINE AND METHOD OF PROPELLING A ROCKET

(75) Inventors: William H. Knuth, Madison, WI (US);
Martin J. Chiaverini, Madison, WI (US);
Daniel J. Gramer, Madison, WI (US)

(73) Assignee: Orbital Technologies Corporation, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/630,091

(22) Filed: Jul. 30, 2003

(65) Prior Publication Data

US 2004/0068976 A1 Apr. 15, 2004

Related U.S. Application Data

(63) Continuation of application No. 09/964,294, filed on Sep. 26, 2001, now Pat. No. 6,601,380, which is a continuation-in-part of application No. 09/337,457, filed on Jun. 21, 1999, now Pat. No. 6,298,659.
(60) Provisional application No. 60/125,910, filed on Mar. 24, 1999.

(51) Int. Cl.$^7$ ................................................ F02K 9/42
(52) U.S. Cl. ...................................................... 60/258
(58) Field of Search .......................... 60/251, 219, 220, 60/257, 258

(56) References Cited

U.S. PATENT DOCUMENTS 3,158,997 A * 12/1964 Blackman et al. ............ 60/251

| 3,640,072 A | 2/1972 | Kayser |
| 3,712,059 A | 1/1973 | Drexhage |
| 3,768,263 A | 10/1973 | Drawbaugh |
| 3,773,462 A | 11/1973 | Waeselynck |
| 3,956,885 A | 5/1976 | Davis et al. |
| 4,811,556 A | 3/1989 | Lau et al. |
| 4,817,890 A | 4/1989 | Coffinberry |
| 4,840,025 A | 6/1989 | Coffinberry |
| 4,841,723 A | 6/1989 | Lau |
| 5,101,623 A | 4/1992 | Briley |
| 5,404,715 A | 4/1995 | Vuillamy et al. |
| 5,622,046 A | 4/1997 | Michaels et al. |
| 6,298,659 B1 | 10/2001 | Knuth et al. |
| 6,354,074 B1 | 3/2002 | Jones et al. |
| 6,601,380 B2 | 8/2003 | Knuth et al. |

* cited by examiner

*Primary Examiner*—Ehud Gartenberg
(74) *Attorney, Agent, or Firm*—Dorsey & Whtiney LLP

(57) ABSTRACT

A hybrid rocket engine and a method for propelling a rocket utilizing a vortex flow field. The flow field includes an outer fluid vortex spiraling toward a closed end of the flow field generating apparatus and an inner fluid vortex substantially concentric with the outer vortex spiraling away from the closed end and toward an outlet opening in which the inner vortex spirals in the same direction as the outer vortex, but in the opposite axial direction. The invention also relates to a rocket propulsion system utilizing the flow field in which the propulsion system includes a combustion chamber with a fuel source and an oxidizer source that deliver the said fuel and said oxidizer to the said outer and inner vortexes in a manner to support a combustion process while flowing along the flow field.

20 Claims, 7 Drawing Sheets

HYBRID ROCKET ENGINE AND METHOD OF PROPELLING A ROCKET

This application is a continuation-in-part of U.S. application Ser. No. 09/337,457 filed Jun. 21, 1999, which claims the benefit of Provisional Application Ser. No. 60/125,910 filed Mar. 24, 1999.

BACKGROUND OF THE INVENTION

1. Field of the Art

The present invention relates generally to a vortex flow field and the apparatus and method to produce and sustain it and more particularly to a hybrid rocket engine and a method of propelling a rocket utilizing such vortex flow field. The flow field in accordance with the present invention is capable of providing separate regions or zones within and among one or more flowing fluids contained within a common chamber, without the need for diaphragms or other physical separators or barriers. It is evident and believed that the flow field of the present invention has utility to a wide range of applications. One general field of application is that of combustion chambers, and more particularly, that of combustion chambers and methods for rocket engines or the like and hybrid rocket propulsion systems. A combustion chamber and method in accordance with one embodiment of the present invention utilizes the unique flow field of the present invention to improve hybrid rocket fuel regression and increase mixing length in a rocket or other engine. Another embodiment is in the form of liquid rocket engine to prevent hot combustion products from contacting the chamber wall.

2. Description of the Prior Art

Virtually countless applications exist for a flow field which is compact and is capable of providing one or more separate regions or zones of flowing fluids within a container, without substantial mixing and without the need for any physical barrier or other separators between such regions or zones. With such a flow field, a chemical reaction, such as combustion, can be induced to incur in one region or zone while a separate fluid or process occupies another region or zone.

Many devices depend upon vortex flows for their successful operation, such as combustion chambers, cyclone separators, classifiers and the like that are in common use. All of these devices introduce swirling flow at one end of a passageway in which the flow follows a generally helical path to exit at the opposite end. Such conventional vortex flows do not achieve zonal separation as does the unique flow field that is the subject of the present invention.

Although the flow field in accordance with the present invention has significant applications in a variety of fields, it has particular application to the field of rocket engines and in one embodiment, specifically to hybrid rocket engines. Hybrid rocket engines denote a class of rocket propulsion systems in which one propellant is in fluid form and the other propellant is in the form of a solid grain. Typically, the fluid propellant is the oxidizer and the solid grain is the fuel. The oxidizer such as liquid oxygen is sprayed into the combustion ports in the solid fuel grain and caused to ignite. The hot combustion products sustain the combustion process until either the oxidizer flow is shut off or the fuel grain is depleted. In virtually all contemporary hybrids of today the limiting design factor is the rate at which the solid fuel grain can be caused to burn. The burn rate, often expressed as regression rate, is the rate at which fuel can be induced to vaporize or ablate off the grain surface so it can participate in the combustion process and contribute to rocket thrust. Because the rate is typically slow, conventional hybrid fuel grains must be made with large exposed surface areas. This is accomplished by casting large open combustion ports in the grain. The large ports waste volume in the high pressure casing, so that a larger, heavier, and more expensive case is needed than would be required if the fuel grain combustion ports could be much smaller by means of a flow field which improves the regression rate.

In recent years, hybrid rockets have received increasing attention from the National Aeronautics and Space Administration (NASA) sectors, Department of Defense, industrial aerospace participants and research institutions because their unique operational characteristics are capable of providing safer, lower-cost avenues to space than conventional solid propellant and liquid bi-propellant rocket propulsion systems. For example, hybrid rocket engines can be easily throttled for thrust tailoring, to perform in-flight motor shutdown and restart and to incorporate non-destructive mission abort modes. Also, since fuel in a hybrid rocket engine is stored in the form of a solid grain, such engines require only half the feed system hardware of liquid bi-propellant engines. Still further, the commonly used butadiene-based solid grain fuels are benign and neither toxic nor hazardous for storage and transportation. The hybrid solid fuel grain is also not susceptible to cracks and imperfections that can lead to catastrophic failure in solid rocket motor propellant grains.

However, despite these benefits, classical hybrid rocket engines, in which the oxidizer gas is injected into the combustion chamber at the end opposite the exit nozzle and in a direction parallel to the solid fuel grain, have not yet found widespread use for either commercial or military applications. Reasons for this include the fact that they suffer from relatively slow solid fuel regression rates, low volumetric loading and relatively poor combustion efficiency. For example, polymeric hybrid fuels such as hydroxyl-terminated polybutadiene (HTPD) regress generally about an order of magnitude slower than solid rocket motor propellants. In an effort to overcome these lower regression rates, complex cross-sectional geometries of the hybrid solid grain fuel with large wetted surface areas are often employed to achieve a large mass of flow rate of pyrolyzed vapor from the fuel grain. It has been shown that a three to fourfold increase in fuel regression rate can result in significant cost reductions, simplified grain manufacturing and large reductions in rocket inert weight.

In addition to problems associated with the low regression (fuel burning) rates of hybrid engines, the short straight line travel of the pyrolyzed fuel grain vapor and oxidizer as they traverse the combustion region results in incomplete mixing. This often necessitates the use of secondary combustion chambers at the end of the fuel grain to complete the combustion process. These secondary chambers add length and weight to the overall design and have the additional disadvantage of serving as a potential source and location of combustion instability.

Furthermore, both conventional hybrids and solid rocket motors must provide insulation layers between the solid propellant grain and the high pressure casing wall. This is necessary to prevent the exposure of the casing to the high temperature combustion gases when the grain material has been burned away out to the casing and no longer provides protection. The insulation adds weight and cost to the motor.

Accordingly, there is a need in the art for a flow field, and a structure and method for producing and sustaining it, which provides separate regions or zones of flowing fluids within a chamber. There is also a need in the art for a combustion chamber and method utilizing such a flow field, and particularly a combustion chamber and method for a hybrid rocket engine, which significantly increases the regression rate of the solid fuel grain and the effective chamber length and mixing within the combustion chamber. There is also a need for a combustion chamber and method utilizing such a flow field that prevents the hot combustion products from reaching the chamber wall.

SUMMARY OF THE INVENTION

In accordance with the present invention, a fluid flow field, and a structure and method for producing and sustaining the field, has been designed. This flow field provides for separate regions or zones of flowing fluids within a chamber without the need for physical barriers or other separators and without substantial mixing between the regions or zones.

In a revolutionary departure from prior art the present invention introduces the incoming swirling flow concentric to the outlet passage and by this means establishes a new and unique flow field not here-to-fore known or described in literature, nor does it have any previously known existing physical embodiments beyond those defined and described herein. The flow field inherently divides into an outer upwardly flowing vortical helix along a chamber wall, an inner downward flowing vortical helix along the center region of the chamber, a converging flow field at the head end where the outer vortex transforms into the inner vortex, a converging flow field as the flow approaches the exit nozzle, and less well defined regions of velocities and pressure gradients elsewhere throughout the chamber.

The distinct regions can be controlled by chamber geometry, fluid injection parameters, external heat addition, and combustion or other chemical reactions to produce certain desired and specific results. These reactions include, but are not limited to, enhanced combustion of materials forming the chamber walls, limitation of combustion to occur in the center vortex only, combination of reactions at the wall, with subsequent separate and different reactions in the central vortex, and fluid distillation and liquid-vapor separation.

The flow field is produced by injecting flow tangentially into a cylindrical chamber which is substantially closed at one end and which has a converging outlet at the other end. In the preferred embodiment, the flow is introduced into the interior of the chamber near the outlet end of the chamber and in a direction which is substantially tangent to, or which creates a flow which is substantially tangent to, the inner wall of the chamber. This tangential injection causes the flow in the chamber to swirl and follow a spiral path up the inner wall of the chamber thereby establishing an annular vortex flow bounded by the inner wall of the chamber. When the spiral flow reaches the closed end of the chamber, the flow inherently translates inwardly to the center of the chamber to form the second vortex where the flow moves spirally away from the closed end, down the core of the chamber and out the chamber nozzle. This inner vortex or spiral flow through the center of the chamber rotates in the same direction as the outer vortex, but at a smaller radius and thus a greater angular velocity in accordance with the principle of angular momentum conservation. The result of the above is the establishment of a radial pressure gradient field throughout the chamber. One key feature of this pressure gradient field occurs at the exit nozzle. Specifically, pressure at the nozzle converging wall increases and pressure at the swirl axis decreases. Accordingly, injection flow at the periphery of the vortex near the outlet end and tangential to the outer vortex streamline cannot penetrate the pressure gradient that has formed by the inner vortex at the nozzle converging region. Thus, this incoming flow cannot flow toward the exit. Instead, it must take an alternate flow path to enter the lower pressure region in the center of the vortex flow approaching the converging nozzle section. This alternate path is up along the wall and then inward to the center vortex before flowing down and out the nozzle. Accordingly, as the inner vortex flow approaches the nozzle, it enters the converging section of the nozzle, thereby increasing the swirl or angular velocity and thus producing an enhanced radial pressure gradient that blocks the outflow of the fresh incoming stream.

The above-described flow field has several unique characteristics. First, the flow path of the injected fluid before reaching the outlet is quite long and highly convoluted. Thus, it provides an opportunity for intense and extensive mixing along the flow path, particularly in the core or inner vortex where the angular velocity of the swirl is greater. Secondly, the outer and inner vortexes are individually discrete. Thus, the fluid flow in the inner vortex does not mix significantly with the fluid flow in the outer vortex. This enables the inner vortex to support burning or other chemical reactions to some significant degree independent of the outer vortex. Because of this, materials such as propellant or other chemicals, can be added to the inner vortex by injection at the conjunction of the two vortices at the closed end of the chamber and cause combustion or other chemical reaction to occur and be sustained wholly in the inner vortex if so desired.

The ability to produce and sustain the above-described double vortex field flow has countless potential applications and several immediate practical applications. By way of example only, one immediate practical application of the flow field of the present invention is in the field of rocket propulsion.

In such an application, utilization of the flow field of the present invention facilitates a combustion chamber and method which provides dramatically increased regression rates of the fuel grain and increased mixing length and improved mixing within the combustion chamber. In a preferred embodiment and application, the present invention provides for a combustion chamber and method for use in a hybrid rocket engine.

In applying the double vortex flow field of the present invention to the preferred embodiment of a hybrid rocket engine, the flow is created by injecting one component of the combustion mixture (such as the oxidizer) into a generally cylindrical combustion chamber which is closed at one end and is provided with a converging outlet nozzle at the other end. By injecting the flow of oxidizer fluid in a direction circumferentially tangent to the inner wall, the fluid is caused to swirl and advance up the cylinder wall in a vortex pattern toward the closed end. When this outer vortex flow reaches the closed end, it moves radially toward the center of the chamber and continues to move in a swirling vortex along the middle or core of the chamber and out through the exit nozzle. If the inner walls of the chamber are hybrid fuel grain and the fuel grain/oxidizer combination is ignited, several unique and advantageous characteristics result. First, the high velocity outer vortex scrubs the burning fuel grain surface, causing enhanced heat transfer to the surface. Combustion near and on the surface is also able proceed because fresh oxidizer is carried directly to the surface by turbulent transport mechanisms in addition to the usual molecular diffusion process. Second, the vortex also sustains radial pressure and density gradients that cause hot, low density combustion products to be buoyed out of the combustion zone so their presence does not hinder the combustion process.

Third, because the flow path of the injected fluid (the oxidizer) to reach the outlet is very long and highly convoluted, it provides an opportunity for intense and extensive mixing and combustion with the fuel grain vapor, particularly in the core or inner vortex. Accordingly, in the above application, the outer vortex flow causes rapid burning of the fuel grain on the wall of the cylinder, and the inner vortex causes combustion to proceed rapidly, by providing intense mixing and combustion travel distance to allow combustion to reach completion, thereby achieving high combustion efficiency.

In general, the structure to produce the flow field of the present invention as well as the structure of the combustion chamber in accordance with the present invention includes a containment chamber with first and second ends which are sometimes referred to as head and tail ends or closed and nozzle ends. In the preferred embodiment, the container inner wall is covered with a solid fuel grain or a fuel source. The chamber is closed at one end and provided with an exit nozzle at its opposite end. One or more fluid (oxidizer) delivery ports are provided near the end of the container adjacent to the nozzle for the purpose of delivering an oxidizer (or other fluid) into the chamber tangentially to the inner surface of the fuel grain coating the inner wall of the chamber. After injection, the oxidizer swirls along the surface of the fuel grain toward the closed end, at which location it moves radially toward the center and then swirls in the form of the inner vortex toward the nozzle end of the cylinder.

The method aspect of producing the flow field of the present invention includes providing a cylindrical chamber with a closed head end and an opposing nozzle end and injecting a fluid tangentially to the inner wall. In the preferred application of the present invention the cylindrical chamber is a combustion cylinder with a closed end and a nozzle end and the inner surface of the chamber is provided with a fuel source. The injected fluid is an oxidizer. Upon injection of the oxidizer, the oxidizer/fuel mixture is ignited.

Accordingly, it is an object of the present invention to provide a flow field, and a structure and method for producing and sustaining such flow field which provides distinct and separate regions of flowing fluid within a chamber, without the use of physical barriers.

Another object of the present invention is to provide an improved combustion chamber and method utilizing the above-described double vortex flow field.

Another object of the present invention is to provide an improved combustion chamber and method utilizing the above flow field and to provide for increased fuel regression rates and increased travel distance and mixing to achieve complete combustion.

A further object of the present invention is to provide a hybrid rocket engine utilizing the above-described double vortex flow field.

A further object of the present invention is to provide a liquid rocket engine utilizing the above-described vortex flow field.

A still further object of the present invention is to provide an improved hybrid rocket propulsion system that facilitates and promotes high and uniform fuel grain regression rates so that small combustion ports can be used in the propellant solid grain.

Another object of the present invention is to provide a hybrid propulsion system that inherently cools the case walls whenever fuel is not present to insulate the wall from hot combustion products.

A more specific object of the present invention is to provide a hybrid rocket propulsion system that creates and uses a unique internal combustion vortex flow field to enhance grain regression rate and to increase the efficiency of the combustion process.

Another object of the present invention is to provide a combusting flow field that allows the use of a single grain port for the combustion process.

A further object of the present invention is to provide an injection means for the fluid propellant that induces the double vortex flow field in the grain combustion port.

A further object of the present invention is to provide a combustion process that inhibits combustion instability.

Another object of the present invention is to provide a double helix flow field in which an outer helix flows upwards along the grain surface inducing combustion, and an inner combustion helix flows down the port centerline and out the nozzle to produce thrust.

To achieve the foregoing and other objects and in accordance with the purpose of the present invention, a self-contained propulsion system is provided with a motor casing that houses a solid propellant grain. A first fluid propellant that will combust when in the presence of the solid propellant in the presence of an ignition source, is stored separately from the solid propellant in a fluid tank. A delivery means supplies at least a portion of the said fluid propellant in either liquid or gaseous state to the combustion port of the solid grain. An ignition means initiates combustion with the combustion port of the solid propellant grain. A fluid injection means that will cause the fluid propellant to enter the solid propellant grain case in such a manner as to form an upflowing helix along the surface of the combustion port in the solid propellant grain and then a downflowing helix along the centerline of the combustion port, said downflowing helix to eventually exit the chamber via the discharge nozzle.

The fluid propellant can be provided to the entrance to the fuel grain case by any of various common means, including delivery from pressurized tanks, or by pumps of suitable designs. The fluid can be either the liquid or gaseous state. Commonly the fluid propellant is the oxidant. In one embodiment, the oxidant is burned in a highly oxidizer-rich combustor (termed a "preburner") and the resulting oxidizer-rich combustion products are used to drive a turbopump that pressurizes the liquid oxidizer for delivery to the preburner. After driving the turbine, the oxidizer-rich combustion products leave the turbine and flow to the injection ports of the fuel grain high pressure casing. The oxidant enters the fuel grain ports in a fluid phase that may be at high enough pressure to be supercritical. The injector elements are positioned and designed such that the injected flow develops the co-axial vortex flow field within the chamber in the manner that is the subject of this invention.

In another embodiment, the oxidizer in liquid state is carried in a high pressure tank. Pressurant is supplied by a conventional tank pressurization system well known to those acquainted with the profession. The liquid oxidant is expelled from the tank and delivered at high pressure to the injection ports of the fuel grain high pressure casing. The oxidant enters the casing in the liquid state and is quickly heated and vaporized as it enters the combustion port of the fuel grain. The injector elements, in concert with the cylindrical casing and cylindrical combustion port in the fuel grain, are designed to impart a strong swirl component to the injected oxidant flow. The swirl acts in the chamber to develop the co-axial vortex flow field that is a key aspect of this invention.

Typical oxidants are oxygen in liquid or gaseous form, inhibited red fuming nitric acid (IRFNA), hydrogen peroxide, nitrogen tetroxide and nitrous oxide.

The solid fuel grain may be of any suitable material. A preferred material used for hybrid fuel is hydroxyl-terminated polybutadine, a complex, rubber-like hydrocarbon formulation that is readily cast and cured at modest cost. Other fuels include paraffins and PMMA. Fillers such as aluminum powder and boron may be added to customize performance. The propellants chosen are not critical to the technology of this invention.

The above and other objects of the present invention will become apparent with reference to the drawings, the description of the preferred embodiment and the appended claims.

DESCRIPTION OF THE PREFERRED EMBODIMENTS

The flow field of the present invention is a double helical vortex flow field comprised of an outer vortex and a substantially concentric inner vortex which rotates in the same direction, but at a higher angular velocity. The inner and outer vortices are substantially discreet and advance in opposite axial directions. As described in greater detail below, the flow field of the present invention comprises a flow field axis having a first end and an opposite constricted second or exit end and three separate and discrete flow regions. These include a first flow region comprising a first or outer, substantially vortex fluid flow around the flow field axis and toward the first end, a second flow region comprising a substantially radial fluid flow from the first vortex fluid flow at the first end toward the flow field axis and a third flow region comprising a second or inner substantially vortex fluid flow around the flow field axis from the first end and toward the second end, with the second vortex flow field being radially inwardly of the first vortex fluid flow. The flow field of the present invention has a wide variety of potential applications. One application is as a combustion chamber for a propulsion system and more specifically as a combustion chamber for a hybrid rocket propulsion system. A preferred embodiment of the flow field of the present invention will be described with reference to the schematic representation of the flow field and the apparatus for producing and sustaining the same as shown in FIG. 1 and with reference to various embodiments of a propulsion system for a hybrid rocket engine utilizing such a flow field.

Figure 1:
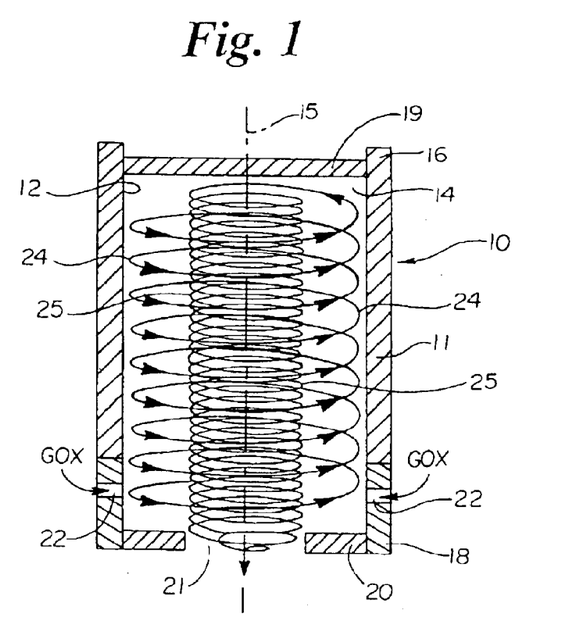
FIG. 1 is a schematic representation of the flow field of the present invention and the apparatus for producing and sustaining the same.

With reference to FIG. 1, the apparatus for producing and sustaining the flow field of the present invention includes a containment cylinder 10 comprised of a generally cylindrical side wall 11 with an inner wall surface 12. The containment cylinder 10 defines a hollow interior flow field chamber 14 having a chamber axis 15 extending generally parallel to the side wall 11. The side wall 11 further includes a first end 16 and a second end 18 opposite the first end 16.

The containment cylinder 10 includes a closed end defined by the closed end wall 19 which extends from the first end 16 of the side wall 11 and is intersected by the chamber axis 15. The opposite end of the containment cylinder 10 is an outlet opening end defined by the wall portion 20. The wall portion 20 extends from the second end 18 of the side wall 11 and includes a restricted opening 21. In the preferred embodiment and throughout the application, the opening 21 may be referred to as a restricted opening in the sense that its diametrical dimension is less than the diametrical dimension of the inner wall surface 12 and thereby restricts the flow of fluid from the flow field chamber 14 out through the opening 21.

Figure 2:
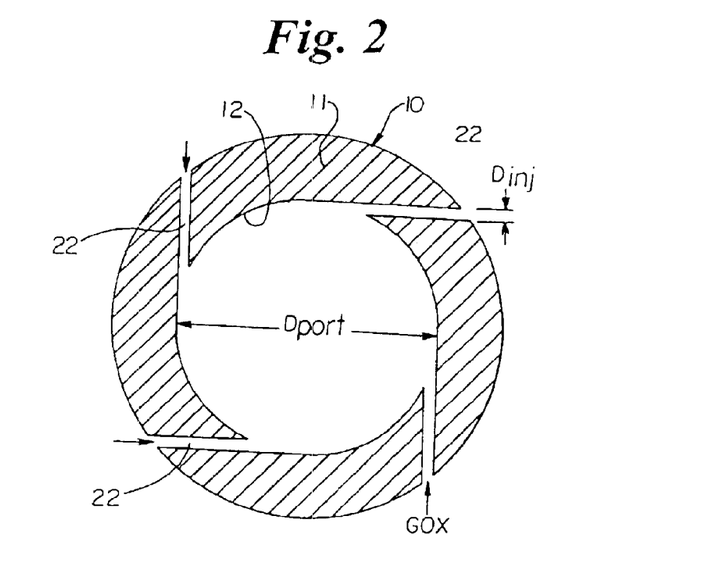
FIG. 2 is a cross sectional view of the apparatus of FIG. 1 showing the fluid inlet passages for creating the flow field of the present invention.

The side wall 11 includes one or more fluid inlets or inlet openings 22 positioned about the periphery of the side wall 11 and extending into the chamber 14. As shown best in FIG. 2, these inlet openings 22 extend through the side wall 11 so that they are directed substantially tangent to the inner wall surface 12. Although any number of openings 22 may be sufficient to produce and maintain the flow field of the present invention, it is preferable for there to be at least two or more inlets 22. In the preferred embodiment, as best shown in FIG. 2, all of the inlets 22 are directed in the same angular direction relative to the chamber axis.

The inlets 22 can be positioned at multiple axial and radial positions in the side wall 11. In the preferred embodiment, however, the inlets 22 are positioned at the same axial position near the restricted opening end 18 of the side wall 11. This enables the incoming fluid to begin forming the flow field near the restricted opening end of the cylinder 10 to achieve maximum benefits from the flow field.

In the preferred embodiment, the containment cylinder 10 is shown as a substantially right cylindrical member meaning that the cylinder 10 has a circular cross-section and the radial distances from the axis 15 to all points on the inner wall surface 12 are equal. However, various other shapes of containment cylinders or containment vessels can be utilized as well. For example, it is contemplated that the side walls 11 could be converging or diverging at any point along their length as they extend between the ends 16 and 18. An example of such a structure would be a frusto-conical configuration. The side walls 11 could also be curved as they extend from one end 16 to the other 18. For example, the side wall as it extends from one end to the other could have a single radius of curvature resulting in the containment vessel or cylinder having a generally spherical configuration. Or the side wall, as it extends from one end to the other, could have multiple curvatures resulting in elliptically shaped or other more complex configurations. Preferably the containment cylinder or vessel 10 has a side wall which is a revolute surface in which the inner wall surface 12 is defined by the revolution of a line (straight or curved) relative to the chamber axis IS. In other words, all points on the inner surface 12 of the side wall 11 which intersect a plane perpendicular to the axis 15 are equidistant from such axis.

The flow field in accordance with the present invention is formed by introducing a fluid into the chamber 14 through the inlet openings 22. Upon being introduced into the interior of the chamber 14 through the inlets 22 in a direction generally tangential to the inner wall surface 12, the fluid flow under its injected momentum, is forced by the inner wall surface 12 to swirl around the surface 12 in a spiral or vortex pattern to form an outer vortex 24. As the introduction of fluid continues, the outer vortex 24 continues to advance up the inner wall surface 12 toward the closed end of the chamber 14 defined by the end wall 19. During this outer vortex flow 24, a pressure gradient is created within the chamber 12 in which the pressure increases exponentially proportional to the radius of the vortex flow from the chamber axis 15. Thus, the above-described outer vortex flow 24 creates a higher pressure area at the inner surface 12 where the radial distance is greater and a pressure gradient toward the center of the chamber 14 along the chamber and vortex axis 15.

When the outer vortex flow 24 reaches the closed end of the chamber 14, the flow travels radially inwardly toward the chamber and vortex axis 15 and the lower pressure area and turns down and continues to swirl in a spiral or vortex pattern toward the outlet opening 21. This vortex flow forms an inner vortex 25 which is internal and co-axial of the outer vortex 24, and which swirls in the same direction, but which advances through the chamber 14 in the opposite axial direction. The inner vortex 25 also creates a pressure gradient which increases exponentially proportional to the radial distance of the rotating fluid from the axis 15. Further, because the vortices formed in the chamber 14 approximate a "free vortex", angular momentum is conserved at all radii. Thus, the inner vortex 25 rotates or swirls about the axis 15 at a greater angular velocity than the outer vortex 24. As the center vortex approaches the exit nozzle, it is forced to converge to the smaller diameter of the nozzle opening. The angular velocity of the flow at the nozzle entrance thus becomes higher and creates a high local pressure gradient at the nozzle entrance. One result of this high pressure gradient is that the local pressure on the nozzle entrance wall is higher than any place else in the chamber. This local high pressure prevents significant axial flow from passing through this local region. Thus, new inflow injected through the inlets 22 is forced by the inner vortex 25 to flow along the outer vortex flow path 24 toward the closed end wall 15 and then inwardly to the inner vortex flow path 25 toward the outlet 21. Upon reaching the outlet opening 21, the swirling fluid from the inner vortex exits the chamber 14.

This flow field has several unique characteristics. First, the flow path of the injected fluid from the inlet 22 along the outer vortex 24, along the inner vortex 25 and out through the opening 21 is quite long and highly convoluted. Thus, it provides an intense and extensive mixing of the injected fluid, particularly in the core or inner vortex 25 where the angular velocity of the swirl is greater. Secondly, the outer vortex 24 and the inner vortex 25 are individually discreet. In other words, because of the various pressure and velocity gradients formed by the outer vortex 24 and inner vortex 25, the fluid flow in the inner vortex 25 does not mix significantly with the fluid flow in the outer vortex. This enables the inner vortex to support burning or other chemical reactions independent of the outer vortex 24. Because of this, reactions initiated in the outer vortex 24 can continue through the inner vortex 25 and materials such as additional oxidizer or other chemicals can be added to the inner vortex 25 by injection at the conjunction of the two vortices at the closed end of the chamber.

Accordingly, the apparatus for producing and sustaining the flow field of the present invention can be summarized as including a flow field chamber comprising a chamber axis extending substantially through the center of the chamber, a side wall with an inner surface encircling the chamber axis, a closed chamber end extending from one end of the side wall and intersected by the chamber axis and an outlet chamber end extending from the opposite end of the side wall and intersected by the chamber axis. The outlet chamber end includes a restricted fluid outlet and the chamber includes one or more inlet openings directed substantially tangent to the inner surface. The method of producing and sustaining the flow field of the present invention includes the step of introducing a fluid flow into the chamber through the inlet openings in a direction substantially tangent to the inner wall surface. It is preferable for at least some of the inflow to be introduced through the wall inlet openings near the level of the outlet end. This produces the field flow of the present invention which comprises an outer vortex adjacent to the inner wall and an inner vortex internal to the outer vortex which rotates in the same direction as the outer vortex, but rotates at a higher angular velocity and flows axially in the opposite direction from the outer vortex.

The above-described flow field of the present invention has countless potential applications where extensive fluid mixing is desired along discrete flow paths or where significant surface contact between a gaseous fluid and a second material is desired. One such application is for use as a combustion chamber in the field of propulsion, and more particularly to a combustion chamber for use in connection with a hybrid rocket propulsion system. The preferred embodiment of such an application is described with reference to FIGS. 3–7.

Figure 3:
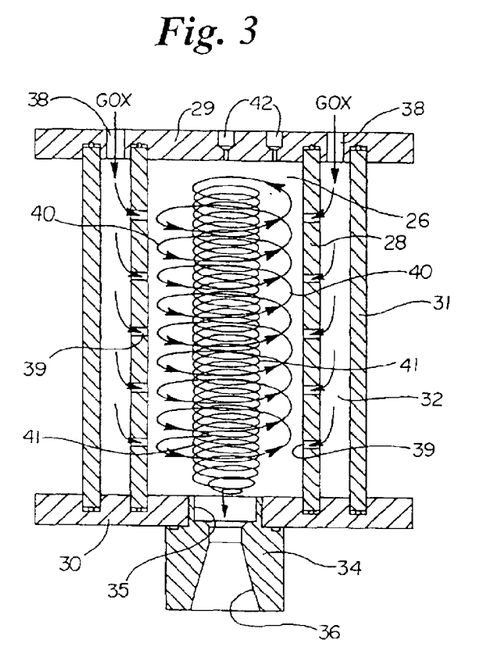
FIG. 3 is one embodiment of a test device for a propulsion system for a liquid rocket engine utilizing the flow field of the present invention.

Reference is first made to FIG. 3 illustrating a propulsion system for a hybrid rocket engine. Specifically, the system of FIG. 3 includes a combustion chamber 26 utilizing the flow field of the present invention and a solid fuel or solid fuel grain together with an oxidizer as the propellant mixture. As shown, the combustion chamber 26 is defined by an inner cylindrical wall 28, a closed end wall 29 and a nozzle end wall 30. An outer cylindrical wall 31 concentric with the inner wall 28 and spaced radially outwardly therefrom function to form a generally annular oxidizer manifold 32 between the walls 28 and 31. In the preferred embodiment, the inner wall 28 and the outer wall 31 are connected with the closed end wall 29 and nozzle end wall 30 as shown. The nozzle end wall 30 is provided with a nozzle assembly 34 including a nozzle opening 35 and a diverging nozzle outlet 36. The closed end wall 29 is provided with one or more primary oxidizer supply ports 38,38 from an oxidizer source for providing fluid oxidizer such as gaseous oxygen to the manifold 32. A plurality of secondary oxidizer inlets 42,42 are also provided in the wall 30 to provide additional oxidizer into the combustion chamber 26 if desired. Such additional oxidizer may be desired to promote and ensure full combustion of the oxidizer-fuel mixture during its passage through the flow field.

In the embodiment of FIG. 3, the inner wall 28 is constructed of a solid fuel grain such as hydroxyl-terminated polybutadiene (HTPB) provided with a plurality of oxidizer inlets 39. Similar to the inlets 22 of FIGS. 1 and 2, the inlets 39 of FIG. 3 are directed in a direction substantially tangent to the inner surface of the side wall 28. Thus, when fluid oxygen is introduced through the inlets 39, it swirls in a spiral pattern along the inner surface of the wall 28 to form an outer vortex 40. This outer vortex swirls toward the closed end wall 29 and then inwardly toward the center of the chamber 26. From here it swirls downwardly through the center of the chamber 26 and toward the nozzle end wall 30 in a continuing spiral pattern to form the inner vortex 41. From here, the fluid in the inner vortex flows out through the nozzle opening 35 and nozzle outlet 36.

Because the inner wall 28 is formed of a solid fuel grain, combustion or burning occurs when an oxidizer such as oxygen is injected into the chamber 26 through the inlets 39 and contacts the solid fuel grain in the presence of ignition conditions. Specifically, as the gaseous oxygen enters the combustion chamber 26, it is forced toward the closed end wall 30 by the favorable axial pressure gradient and forced outwardly by centrifugal acceleration resulting from the tangential direction of injection. The oxidizer spirals along a helical path upwardly along the fuel surface of the wall 28, mixing and burning with vaporized fuel from the grain surface. At the top of the chamber, this outer burning vortex 40 converts into a downward spiraling inner vortex 41 that eventually passes through the nozzle opening 35. The combustion results in increased temperature within the combustion chamber 26 and thus increased angular velocity and mixing within the outer vortex 40 and inner vortex 41. As a result of the extensive mixing and highly convoluted flow path along the outer and inner vortices, the combustion is highly efficient. Further, because of the extensive surface contact between the oxidizer and the fuel grain along the outer vortex 40, there is an increased burning or combustion rate of the solid fuel, thereby significantly increasing the solid fuel regression rate. Tests have demonstrated as much as an 800% or more increase in solid fuel regression rates over those of comparable classic conventional hybrids.

Although ignition can be caused to occur at any location along the inner wall 28, it preferably is caused to occur near the nozzle end of the chamber 26 and then it quickly spreads upwardly over the entire grain inner surface. This results in the maximum benefit of the combustion flow field of the present invention.

Figure 4:
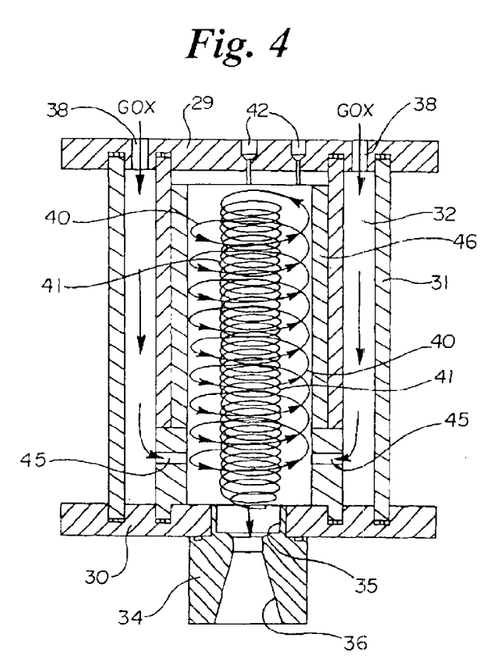
FIG. 4 is a further embodiment of a test device for a propulsion system for a liquid rocket engine utilizing the flow field of the present invention.

The embodiment of FIG. 4 is similar to that of FIG. 3 except that the inner wall 44 is not provided with inlet openings along its length like the inner wall 28 of FIG. 3. Instead, the wall 28 is substantially solid and cylindrical as shown. Further, the embodiment of FIG. 4 includes a plurality of oxidizer inlets near the nozzle end for introducing oxidizer into the chamber 26 and a solid fuel grain layer 46 is provided or formed on the inner surface of the wall 44 to serve as the fuel with which the oxidizer reacts during combustion. Otherwise the embodiment of FIG. 4 is the same as that of FIG. 3.

During operation, oxidizer in the form of oxygen or other appropriate oxidant is introduced into the manifold 32 through the inlets 38. The oxidizer then enters the chamber 26 through the inlets 45 and forms the flow field of the present invention with the outer vortex 40 and the inner vortex 41 as shown. During this passage along the flow field, the oxidizer contacts the fuel grain 46 and the same is ignited, preferably near the nozzle end of the chamber. A common solid fuel 46 is HTPB, although other solid fuels of designer choice may be used as well.

Figure 5:
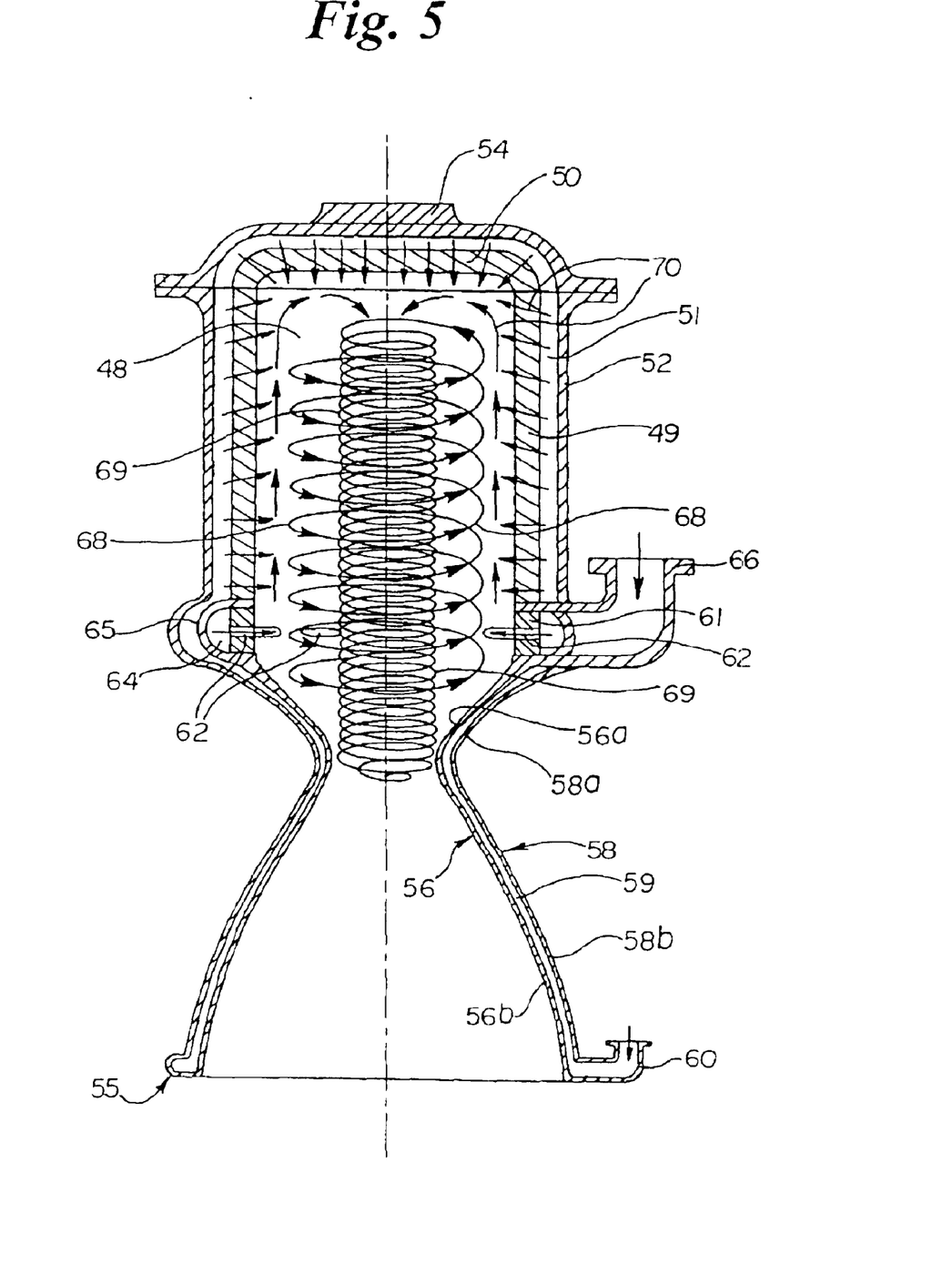
FIG. 5 is a further embodiment of a propulsion system for a hybrid liquid rocket engine utilizing the flow field of the present invention.

FIG. 5 illustrates a further embodiment of a propulsion system for a bi-propellant liquid rocket engine comprising a combustion chamber utilizing the flow field of the present invention. In FIG. 5, the system includes a combustion chamber 48 defined by a porous fuel injection wall comprised of a generally cylindrical side wall portion 49 and a generally planar end wall portion 50. In the preferred embodiment, the wall portions 49 and 50 are porous to permit passage of liquid or gaseous fuel from the fuel manifold 51 and into the chamber 48. The manifold 51 is defined on its outer side by the chamber housing which comprises a cylindrical portion 52 conforming in shape and configuration to the wall portion 49 and a closed end portion 54 conforming substantially to and spaced outwardly from the planar wall portion 50.

The nozzle end of the propulsion system of FIG. 5 is provided with a regenerative cooling nozzle skirt 55 comprised of the skirt inner wall 56, the skirt outer wall 58 and the cooling skirt chamber or passageway 59 positioned between the walls 56 and 58. Preferably the skirt inner wall 56 includes a converging portion 56a and a diverging portion 56b. Similarly, the skirt outer wall 58 includes a converging portion 58a and a diverging portion 58b. The lower end of the diverging portion of the nozzle includes a fuel inlet 60 in communication with the cooling skirt passageway 59. As shown, the cooling skirt passageway 59 is also in communication with the fuel supply manifold 51. Thus, liquid or gaseous fuel provided through the fuel inlet 60 flows through the cooling skirt chamber 59 and into the fuel supply manifold 51. From there it flows through the porous fuel injection wall portions 49 and 50 into the combustion chamber 48.

The nozzle end of the cavity 48 is further defined by a wall portion 61 positioned as an extension of the fuel supply wall 49. The wall portion 61 is provided with one or more oxidizer inlets 62. Like the oxidizer inlets 22 of FIGS. 1 and 2 and the inlets 39 and 45 of FIGS. 3 and 4, the inlets 62 are disposed in a direction substantially tangent to the inner surface of the wall portions 49 and 61. A generally annular oxidizer manifold 64 defined by the manifold housing 65 extends around the chamber and provides a passage for the flow of oxidizer such as oxygen through the inlet 66 into the manifold 64 and then through the inlets 62 and into the chamber 48.

Similar to the other embodiments, the introduction of the oxidizer through the inlets 62 creates a flow field comprising an outer vortex 68 and an inner vortex 69. During the passage of oxidizer along this path, it contacts and mixes with the liquid or gaseous fuel flowing inwardly through the porous wall portions 49 and 50 along the paths defined by the directional arrows 70. When ignited, the oxidizer and fuel burn to create the high pressure combustion products that are expelled through the nozzle to produce the propulsion force.

One primary feature of the embodiment of FIG. 5 is that it facilitates the use of liquid or gaseous fuel such as liquid Rocket Propellant 1 (RP-1) and liquid or gaseous hydrogen, among other appropriate rocket propellants which designers may choose. The embodiment of FIG. 5 also provides a means for cooling the nozzle end of the system as well as the outer chamber housing walls 52 and 54 as the fuel flows through the cooling skirt 59 and the fuel supply manifold 51. This facilitates construction of the rocket propulsion system of FIG. 5 from materials which are less heat resistant and thus less expensive than previous liquid rocket engine designs.

In the embodiment of FIG. 5, the fuel is shown as being provided through the porous wall portions 49 and 50, while the oxidizer is shown as being injected through the inlets 62. It is permissible that these be reversed, depending on the nature of the propellant, their densities and the optimum mixture rate. For example, the oxidizer is preferably provided through the tangential inlets 62 to form the double vortex flow field for the case where significantly more oxidizer is utilized then fuel. Generally, depending on the particular fuel, about two times as much, to as much as six times as much, oxidizer is used as fuel. However, in some cases the ratios may be reversed and cause the designer to revise the propellant roles.

Figure 6:
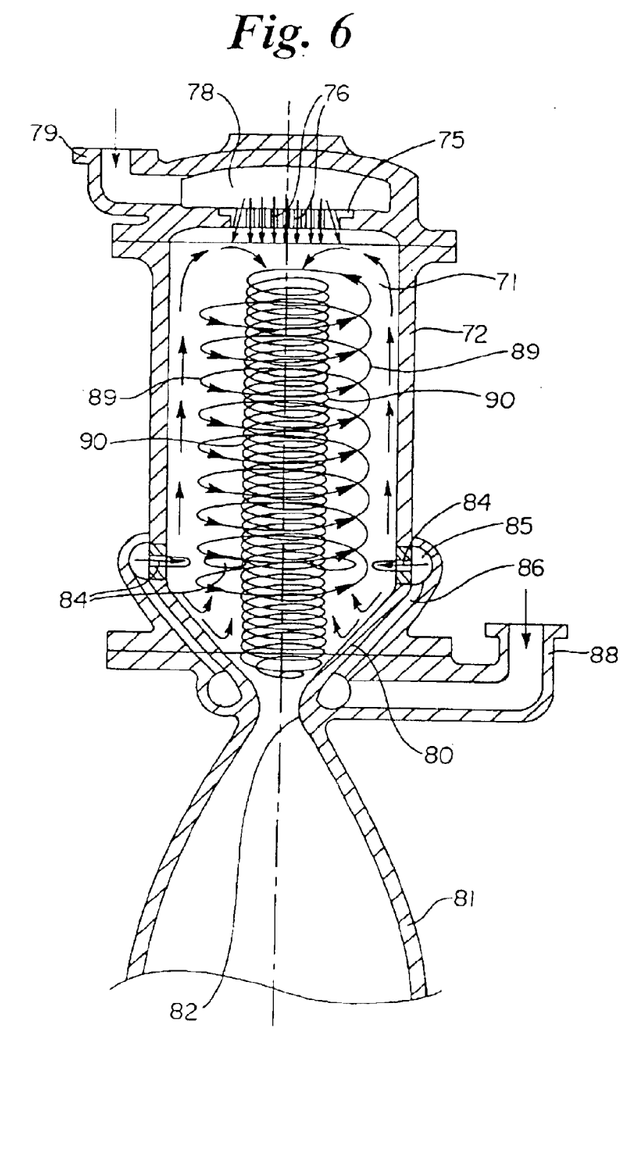
FIG. 6 is a further embodiment of a propulsion system for a hybrid liquid rocket engine utilizing the flow field of the present invention.

The embodiment of FIG. 6 is a further embodiment of a liquid rocket propulsion system and includes a combustion chamber 71 defined by a generally cylindrical chamber side wall 72 and a closed end defined by the end wall 74. Positioned in the central portion of the end wall 74 is a fuel supply injector 75 comprising a plurality of fuel inlet ports or openings 76. The fuel inlet ports or openings 76 are connected with the closed end fuel manifold 78 which is in turn connected with the fuel source inlet 79. In this embodiment, the fuel source is a fluid fuel source which is as RP-1 (a kerosene type fuel). However, gaseous fuels may be used equally well.

The nozzle end of the chamber includes a converging nozzle housing portion 80 extending from the bottom end of the side wall 72 and converging toward the nozzle throat 82. The nozzle end also includes a diverging nozzle portion 81 extending from the nozzle throat 82. The lower or nozzle end of the side wall 72 is provided with a plurality of oxidizer inlets 84 positioned around the periphery of the chamber. These are directed tangentially to the inner surface of the side wall 72. An annular oxidizer manifold 85 encircles the side wall 72 in the area of the inlets 84 and is connected with a regenerative cooling skirt 86 surrounding the converging portion 80 of the nozzle end. An oxidizer inlet 88 connects the cooling skirt 86 with an oxidizer source.

During operation, oxidizer is introduced into the inlet 88. From there the oxidizer flows through the cooling skirt 86 through the oxidizer inlets 84 and tangentially into the chamber 71. As discussed previously, this forms a field flow comprising the outer vortex 89 and the inner vortex 90. Unlike the other embodiments, the embodiment of FIG. 6 introduces the fuel only at the closed end of the chamber from the fuel manifold 78 through the fuel inlet ports 76. Likewise, ignition occurs at the closed end of the chamber where the oxidizer is combined with the incoming fuel. Thus, in the embodiment of FIG. 6, all of the combustion occurs in the inner vortex 90.

A significant advantage of this embodiment is the fact that the portion of the oxidizer flow in the outer vortex 89 spirals along the wall 72, without combustion, until it reaches the closed end, where it mixes with the fuel and the mixture is ignited. Because no combustion can occur in the outer vortex 89 along the wall 72 because of the absence of fuel there, the wall 72 is kept relatively cool, despite the extremely hot combustion temperatures in the inner vortex. This permits the combustion chamber to be constructed of cheaper materials which are less heat resistant than those of prior liquid rocket engines. It also greatly increases the service life of the chamber.

Although not specifically illustrated in the drawings, a control mechanism is associated with each of the embodiments of FIGS. 3–6 to control the flow of oxidizer into the system. Such control mechanism also controls the supply of liquid or gaseous fuel in the embodiments of FIGS. 5 and 6. Preferably, the flow of these fluids is controlled to provide the desired combustion and thrust and to optimize the efficiency to the extent possible. These control systems are well known to those proficient in the art and may be of any of several means and yet be within the spirit of this invention.

Figure 7:
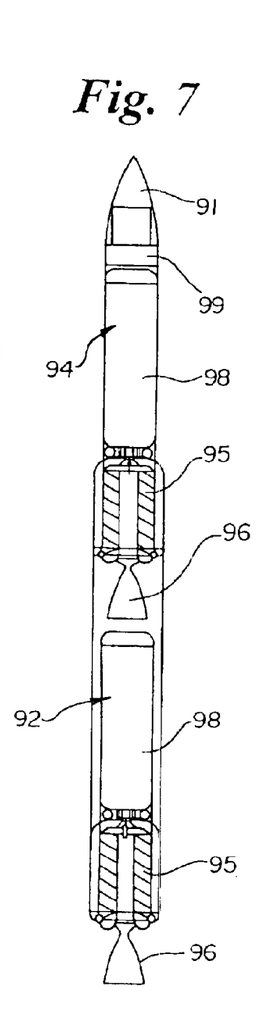
FIG. 7 is a schematic illustration of a two stage rocket including propulsion systems utilizing the flow field of the present invention.

FIG. 7 is a schematic representation of a double stage rocket comprising a rocket payload 91, a first liquid or hybrid stage 92 and a second liquid or hybrid or liquid stage 94. The size of the stages 92 and 94 may be varied to meet the particular propulsion requirements of the rocket. Each of the first and second stages 92, 94 includes a combustion chamber 95 conforming substantially to one of the propulsion system embodiments described above. Extending from the nozzle end of each combustion chamber 95 is an exhaust nozzle 96. Also associated with each stage 92 and 94 is a fuel and oxidizer source 98. Positioned in a suitable compartment of the rocket is the rocket guidance and control system 99.

Figure 8:
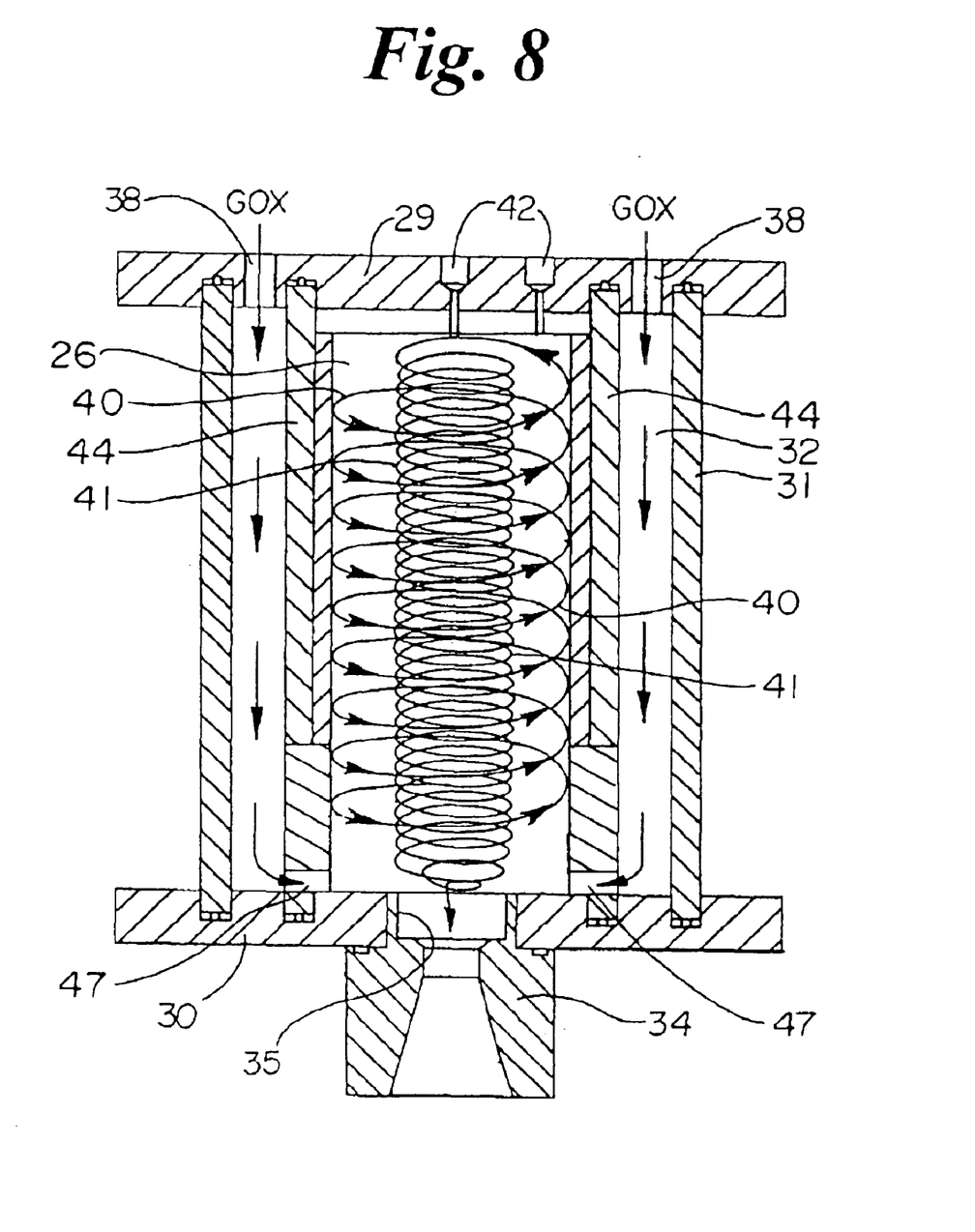
FIG. 8 is a further embodiment of a propulsion system for a rocket engine.

FIG. 8 is a view of a further embodiment of a hybrid rocket engine. The combustion chamber 26 of FIG. 8 is defined in part by the solid fuel grain 46. Further, the chamber 26 includes a wall portion with an inner surface and comprised of a side wall portion and an outlet end wall portion. The side wall portion includes the wall 44 and the fuel grain 46, while the outlet end wall portion includes the base or end wall 30. This view is similar to that of FIG. 4 except that the inner wall 44 is provided with inlet openings 47 at the lower end of the wall 44 adjacent to the base or outlet end wall 30. Preferably, there is no axial distance between the upper surface of the base 30 and the inlets 47. Accordingly, when oxidizer or other fluid enters the combustion chamber 26, all of the flow is directed in a tangential direction in a spiral pattern which flows upwardly toward the closed end wall 29. As shown, the embodiment of FIG. 8 is free of any inlet opening openings other than those adjacent to the wall 30.

Figure 9:
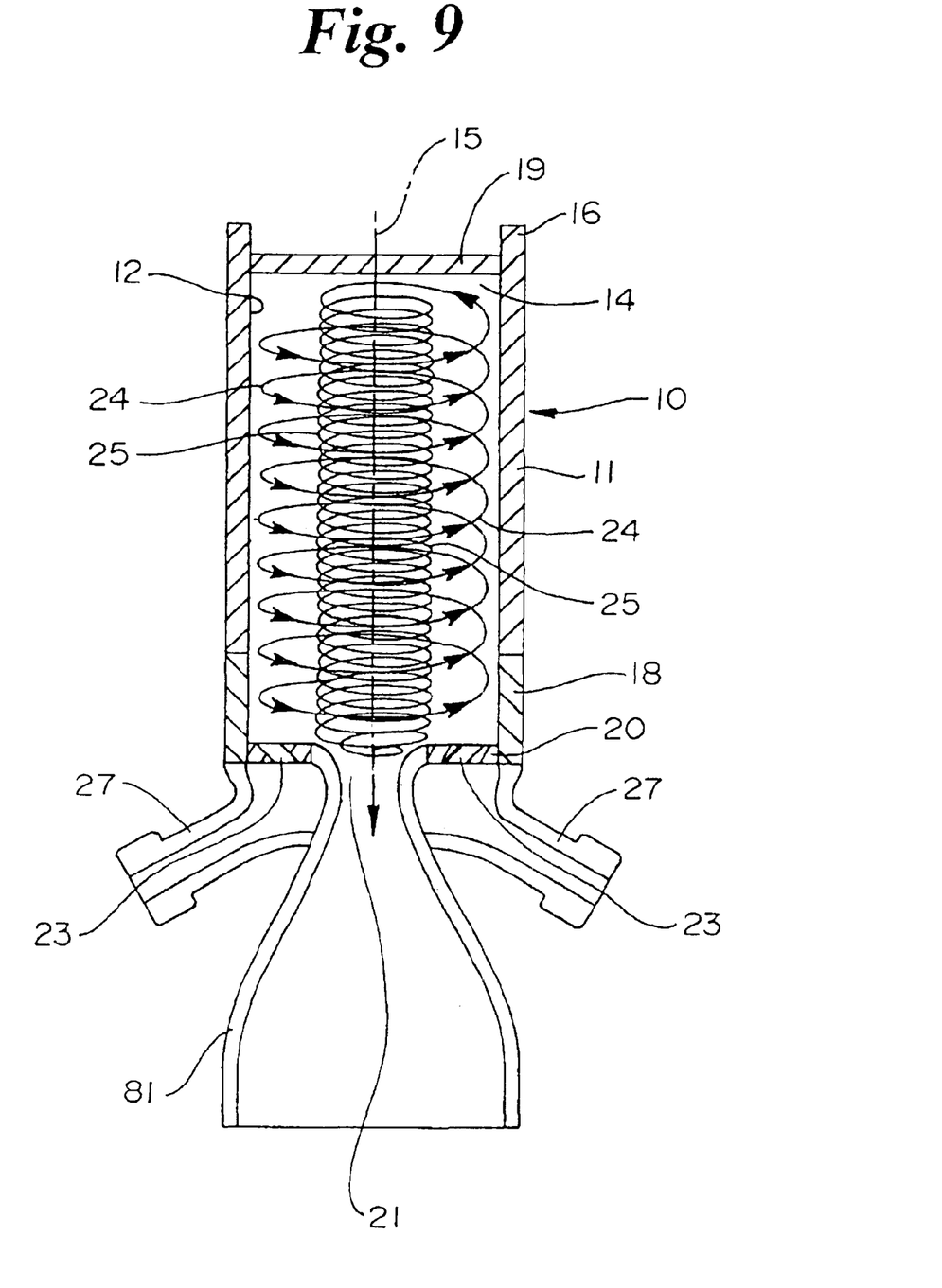
FIG. 9 is a further embodiment of a propulsion system for a rocket engine.
Figure 10:
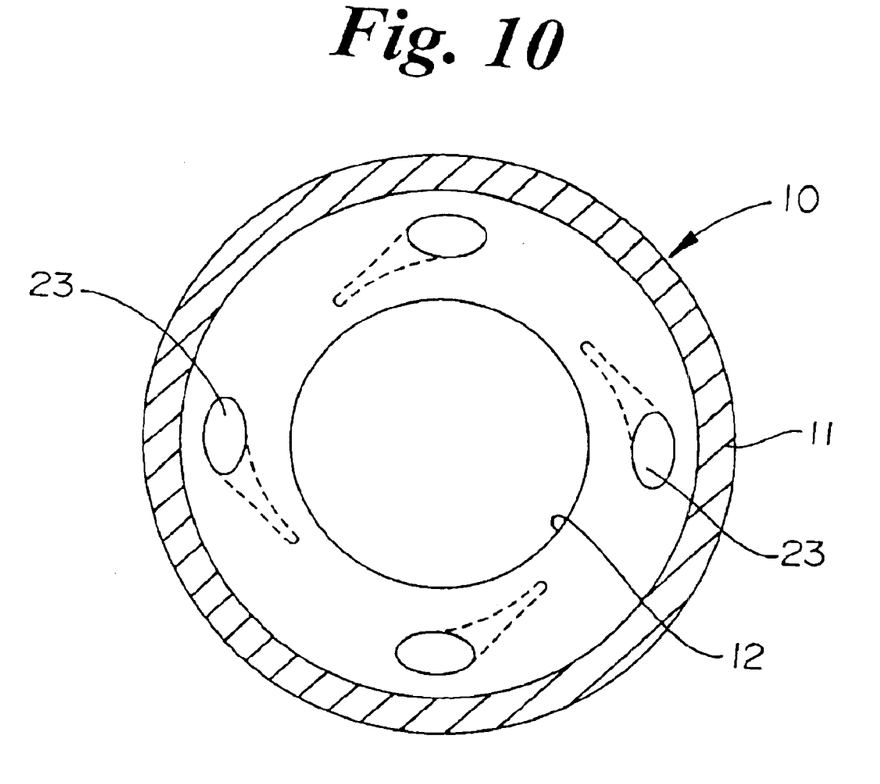
FIG. 10 is a view, partially in section, as viewed along the section line 10—10 of FIG. 9.

A further embodiment of a hybrid rocket engine is shown in FIGS. 9 and 10. In this embodiment, a plurality of oxidizer inlets 23 are provided in the base wall portion 20 as shown. Preferably these inlets 23 angle upwardly with an outward radial velocity component to ensure that the injected fluid will travel in a spiral vortex up the wall 11 of the chamber 14. With specific reference to FIG. 9, the rocket engine is provided with a nozzle portion 81 extending downwardly from the wall portion 20 and one or more inlet nozzles 27 forming a common manifold for supplying oxidizer or other fluid to the interior of the chamber 14 through the inlets or injection ports 23. In the embodiment of FIGS. 9 and 10, the side wall 11 is free of any inlet openings.

Although the descriptions of the preferred embodiments have been quite specific, it is contemplated that various modifications could be made without deviating from the spirit of the present invention. Accordingly, it is intended that the present invention be dictated by the appended claims rather then by the descriptions of the preferred embodiments.

What is claimed is:

1. A rocket engine comprising:
   a combustion chamber defined by a wall portion and having a chamber axis, a closed end and a nozzle end, said wall portion including a closed end wall, a nozzle end wall and a side wall between said closed end wall and said nozzle end wall, said side wall having an inner side wall surface;

an outlet nozzle at said nozzle end;

at least one first fluid inlet opening in said wall portion for directing a first combustion component fluid into said chamber to create an outer spiral flow of said first combustion component fluid from said at least one first fluid opening along said inner side wall surface toward said closed end, then inwardly toward said chamber axis and then along said chamber axis in an inner spiral flow toward said nozzle end;

at least one second fluid inlet opening in said side wall or said closed end wall for introducing said second combustion component fluid into said chamber at a point downstream from said at least one first fluid opening and at a point prior to said inner spiral flow.

2. The rocket engine of claim 1 wherein all of said second fluid openings are downstream from all of said first fluid openings.

3. The rocket engine of claim 1 wherein at least one of said second fluid openings is in said closed end wall.

4. The rocket engine of claim 3 wherein all of said second fluid openings are in said closed end wall.

5. The rocket engine of claim 1 wherein said one of said first and second combustion component fluids is an oxidizer fluid and the other of said first and second component fluids is a fuel fluid.

6. The rocket engine of claim 5 wherein at least one of said second fluid openings is in said closed end wall.

7. The rocket engine of claim 6 wherein all of said second fluid openings are in said closed end wall.

8. The rocket engine of claim 5 wherein said first and second combustion component fluids are an oxidizer fluid and a fuel fluid, respectively.

9. The rocket engine of claim 8 wherein at least one of said second fluid openings is in said closed end wall.

10. The rocket engine of claim 1 wherein said nozzle end includes a nozzle converging portion.

11. The rocket engine of claim 1 including a cooling skirt surrounding a portion of said nozzle converging portion.

12. The rocket engine of claim 11 wherein said cooling skirt includes a cooling chamber.

13. The rocket engine of claim 12 wherein said cooling chamber is in communication with said first fluid inlet openings.

14. A method of propelling a rocket comprising:

providing a rocket engine having a closed end, a nozzle end and a combustion chamber defined by a wall portion, said wall portion at least including a side wall portion and a closed end wall portion;

introducing a first combustion component fluid through one or more first fluid inlet openings in said wall portion, said first combustion component fluid being introduced to create an outer spiral flow of said first combustion component fluid from said one or more first fluid openings along said inner surface toward said closed end, then inwardly toward the center of said chamber and then outwardly in an inner spiral flow toward said nozzle end;

introducing a second combustion component fluid through one or more second fluid inlet openings in said wall portion at a point downstream from said first fluid inlet openings and at a point prior to said inner spiral flow.

15. The method of claim 14 including introducing said second combustion component fluid near said closed end.

16. The method of claim 15 including introducing said second combustion component fluid at said closed end.

17. The method of claim 14 wherein one of said first and second combustion component fluids is an oxidizer fluid and the other of said first and second combustion component fluids is a fuel fluid.

18. The method of claim 17 wherein said first combustion component fluid is an oxidizer fluid and said second combustion component fluid is a fuel fluid.

19. The method of claim 18 including igniting said oxidizer fluid and said fuel fluid at said closed end.

20. The method of claim 14 wherein said first and second combustion components form a fuel mixture and wherein the method includes igniting said fuel mixture within said combustion chamber.

* * * * *